Figure 1:
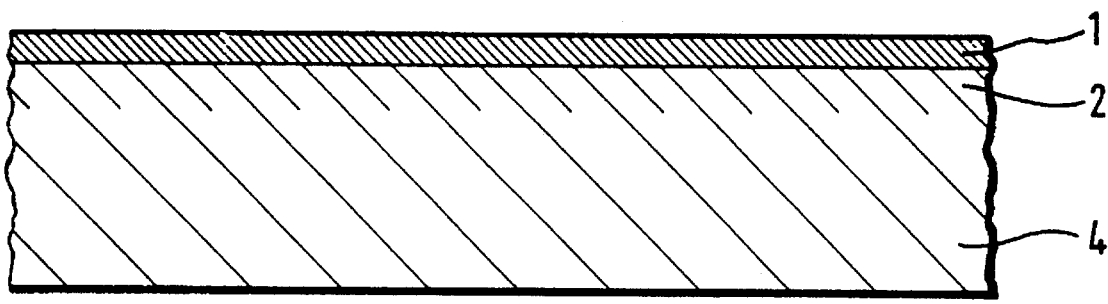

United States Patent [19]

Jackel

[11] Patent Number: 5,571,341
[45] Date of Patent: Nov. 5, 1996

[54] THERMOCHEMICAL TREATMENT OF THIN-WALLED STRUCTURAL STEEL ELEMENTS

[75] Inventor: Dieter Jackel, Herzogenaurach, Germany

[73] Assignee: Ina Walzlager Schaeffler KG, Germany

[21] Appl. No.: 403,273

[22] Filed: Mar. 13, 1995

[30] Foreign Application Priority Data

Mar. 16, 1994 [DE] Germany ............... 44 08 866.3

[51] Int. Cl.⁶ ............... C22C 38/00; C23C 8/32
[52] U.S. Cl. ............ 148/210; 148/218; 148/220; 148/319
[58] Field of Search ............... 148/210, 218, 148/220, 319

[56] References Cited

U.S. PATENT DOCUMENTS 5,252,146  10/1993  Wen et al. ............... 148/218

FOREIGN PATENT DOCUMENTS 2170825  8/1986  European Pat. Off. ............... 148/218

OTHER PUBLICATIONS

Merriman, A Dictionary of Metallurgy, p. 23, 1958.

Primary Examiner—Deborah Yee
Attorney, Agent, or Firm—Bierman and Muserlian

[57] ABSTRACT

A process for the thermochemical treatment of thin-walled structural elements made of steel comprising enriching an edge zone of a thin-walled structural element with nitrogen and carbon at 590° to 700° C. to harden the edge zone whereby an intermediate layer (3) is formed in the diffusion zone (2), said intermediate layer comprising 1 to 3% by weight of nitrogen and at most 0.8% by weight of carbon and cooling the said thin-walled structural element under an inert atmosphere at a rate of 50° to 100° C. per minute to room temperature to form a nitrogen austenite and/or braunite phase between the connection layer (1) and the basic structure (4) with increased fatigue strength.

5 Claims, 1 Drawing Sheet

THERMOCHEMICAL TREATMENT OF THIN-WALLED STRUCTURAL STEEL ELEMENTS

STATE OF THE ART

A process of this type for increasing hard wearing properties is called nitrocarburizing and this is a thermochemical process for enriching the edge layer of a work piece with nitrogen and carbon with the formation of a connection layer, and, underneath the connection layer, a diffusion zone enriched primarily with nitrogen is formed (Beratungsstelle für Stahlverwendung, 447 Nitrieren und Nitrocarburieren, 2nd Edition 1983).

According to the prior art, nitrocarburizing has been carried out below as well as also above the so-called eutectoid temperature of 590° C. The disadvantage in the first case resides in that, due to the relatively low temperature, no eutectoid breakdown of the nitrogen austenite to form braunite occurs, but a relative long treatment time is required. In the second case, braunite formation is prevented through a fast cooling/quenching. However, the austenite or martensite structure generated therein has the disadvantage that it must be tempered in a succeeding stage to avoid brittleness (DE 3,225,686 C3).

Furthermore, parts which have been hardened martensitically, are subject to dimensional distortion so that, due to the accuracy to the shape required, mechanical postprocessing is required, which removes again the wear-resistant outer surface layer, at least partially. In addition, martensitically hardened parts must also be cleaned since they are quenched in an oil bath. All the known processes have in common that the hard wearing properties do not do justice to every case of application, such as occurs with tribologically highly stressed structural parts such as cup tappets in the valve gear of an internal combustion engine. The nitrocarburizing with its disadvantages was used according to the prior art for solid as well as for thin-walled parts.

OBJECTS OF THE INVENTION

It is an object of the invention to create a thermochemical treatment process for thin-walled structural parts which, on the one hand, ensures sufficient wear resistance and structural part strength in the case of tribologically highly stressed structural parts, and which, on the other hand, can be realized under economical conditions.

This and other objects and advantages of the invention will become obvious from the following detailed description.

THE INVENTION

The novel process of the invention for the thermochemical treatment of thin-walled structural elements made of steel comprises enriching an edge zone of a thin-walled structural element with nitrogen and carbon at 590° to 700° C. to harden the edge zone whereby an intermediate layer (3) is formed in the diffusion zone (2), said intermediate layer comprising 1 to 3% by weight of nitrogen and at most 0.8% by weight of carbon and cooling the said thin-walled structural element under an inert atmosphere at a rate of 50° to 100° C. per minute to room temperature to form a nitrogen austenite and/or braunite phase between the connection layer (1) and the basic structure (4) with increased fatigue strength. Braunite as used herein is an eutectoid mixture of ferrite and iron nitride $Fe_4N$ as defined in Metallographie published by VEB Deutscher Verlag für Grundstoffindustrie (1967).

The effect of this intermediate layer comprising nitrogen austenite and/or braunite which has a thickness of at least 30% of the connection layer, is not suppressed with thin-walled structural elements, due to the residual transverse section which is low in comparison to this intermediate layer, and leads without further post-treatment, compared to the known processes according to prior art, to an increase of the dynamic and static strength. In other words, in contrast, in thick-walled structural elements, the strength-increasing effect of the intermediate layer is canceled by the superproportionally large fraction of the residual transverse section.

At cooling rates above 50° C./minute, the nitrogen austenite is strongly supercooled so that even at ambient temperature in the nitrogen-rich regions close to the surface of the diffusion zone, this structural modification is present i.e. this intermediate layer comprising nitrogen austenite and/or braunite is generated between the connection layer and the basic structure.

A further advantage of the process of the invention resides in that the length of the heat treatment of customarily several hours can be reduced to less than one hour. Such thermochemically treated parts do not need to be cleaned nor must they be subjected to a succeeding mechanical fine processing to maintain permanence of dimension.

In a further development of the invention, the nitrogen hardening can take place in gas, in plasma or in a salt bath and the gas nitrocarburizing takes place in a gas mixture comprising ammonia, carbon dioxide, nitrogen and in an endothermic or exothermic atmosphere.

Figure 2:
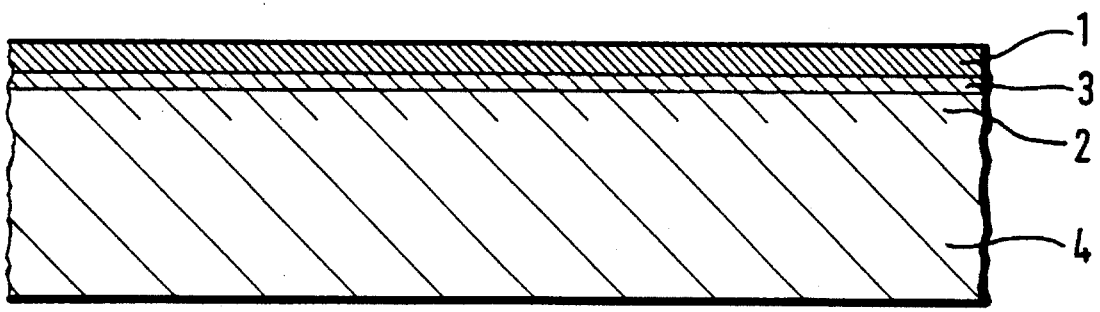

Referring now to the drawings: FIG. 1 is a cross-section of a nitro-carbonated structural element of the prior art illustrating the layer structure thereof. FIG. 2 is a cross-section of a nitro-carbonated structural element of the present invention illustrating the layer structure thereof.

In the following example, there is illustrated a preferred embodiment of the invention to illustrate the same. However, it should be understood that the invention is not intended to be limited to the specific embodiment.

EXAMPLE

Cages for a roller bearing fabricated from St3 steel were subjected to different thermochemical treatments and then to testing for determining the web strength wherein a load is applied at the center of the webs with a needle or tappet, the direction of application of the loading force being the peripheral direction of the cage and not towards the center of the cage.

First, as a comparison sample, a cage was nitrocarburized at 580° C. and subsequently cooled. The layer structure of its edge zone is depicted schematically in FIG. 1. Adjoining an outer connection layer (1) comprising ε-nitrides, ρ-nitrides, carbides and carbonitrides, is a diffusion zone (2), comprising nitrides, carbides, carbonitrides and ferrite. The relative magnitudes of the connection layer (1) and the diffusion zone (2) are such that the thickness of the connection layer is up to 20 μm, while the diffusion zone can have a thickness of several tenths of a millimeter. The diffusion layer (2) is adjoined by the starting material (4).

Two further cages were nitrocarburized at 630° C. and subsequently cooled under a protective gas at different rates, but markedly faster than the comparison cage. Accordingly, the layer structure of the edge zone which in FIG. 2 is depicted schematically, was obtained. Between connection layer (1) and starting material (4), an intermediate layer (3) was generated which, depending on the cooling conditions, was a nitrogen austenite layer and/or a braunite layer. The connection layer (1) had a thickness in the range of 12 to 15 μm, while the intermediate layer (3) comprising nitrogen austenite and/or braunite had a thickness of approximately 7 μm.

A comparison of the fatigue strength, standardized to the same web transverse section showed that it was 8.4 N in the case of the cage nitrocarburized according to the prior art, while it was determined to be 14.0 N in the case of nitro-carbureted cages with braunite layer and 14.2 N for nitro-carbureted cages with nitrogen austenite layer.

Various modifications of the process of the invention may be made without departing from the spirit or scope thereof and it is to be understood that the invention is intended to be limited only as defined in the appended claims.

What i claim is:

1. A process for the thermochemical treatment of thin-walled structural elements made of steel comprising enriching an edge zone of a thin-walled structural element with nitrogen and carbon at 590° to 700° C. to harden the edge zone whereby an intermediate layer (3) is formed in the diffusion zone (2), said intermediate layer comprising 1 to 3% by weight of nitrogen and at most 0.8% by weight of carbon and cooling the said thin-walled structural element under an inert atmosphere at a rate of 50° to 100° C. per minute to room temperature to form a nitrogen austenite and/or an eutectoid mixture of ferrite and iron nitride $Fe_4N$ phase between the connection layer (1) and the basic structure (4) with increased fatigue strength.

2. The process of claim 1 wherein the thin-walled structural element is selected from the group consisting of roller bearing cages, bushings, deep-drawn steel disks or sleeves, case-hardening steel, tempering steel and roller bearing steel.

3. The process of claim 1 wherein the nitrogen enriching is effected in a salt bath or in gas or in plasma.

4. The process of claim 1 wherein the nitrogen and carbon enriching is effected in a gas mixture of ammonia, carbon dioxide and nitrogen in an endothermic or exothermic atmosphere.

5. A thin-walled structural element made of steel produced by the process of claim 1.

* * * * *